United States Patent [19]
Oota

[11] 4,065,082
[45] Dec. 27, 1977

[54] ENGINE MOUNTING APPARATUS

[75] Inventor: Shingo Oota, Komatsu, Japan

[73] Assignee: Kabushiki Kaisha Komatsu Seisakusho, Tokyo, Japan

[21] Appl. No.: 734,633

[22] Filed: Oct. 21, 1976

[30] Foreign Application Priority Data

Oct. 23, 1975 Japan .................. 50-143644

[51] Int. Cl.² .................. B60G 11/18
[52] U.S. Cl. .................. 248/9; 248/22
[58] Field of Search .................. 248/9, 22, 21

[56] References Cited
U.S. PATENT DOCUMENTS

| | | | |
|---|---|---|---|
| 2,359,941 | 10/1944 | Rosenzweig | 248/21 |
| 2,441,509 | 5/1948 | Robinson | 248/22 |
| 2,459,741 | 1/1949 | Kubaugh | 248/22 |
| 2,520,757 | 8/1950 | Cain | 248/22 |
| 2,660,387 | 11/1953 | Roy | 248/21 |
| 2,770,433 | 11/1956 | McNally | 248/22 |
| 3,035,799 | 5/1962 | Peirce | 248/22 X |
| 3,191,716 | 6/1965 | Eitel | 248/22 X |
| 3,350,042 | 10/1967 | Stewart et al. | 248/9 |
| 3,756,551 | 9/1973 | Bishop | 248/9 |

Primary Examiner—Francis K. Zugel
Attorney, Agent, or Firm—Armstrong, Nikaido & Marmelstein

[57] ABSTRACT

An engine mounting apparatus adapted to absorb engine vibration in every direction which comprises the base frame of a vehicle, a bracket for mounting the engine on said base frame, a first bolt for fastening said bracket against said base frame, a cushion rubber disposed coaxially with said first bolt, and a second bolt having a spacer on the periphery thereof so as to provide a clearance between the bracket and the outer periphery of the spacer.

3 Claims, 8 Drawing Figures

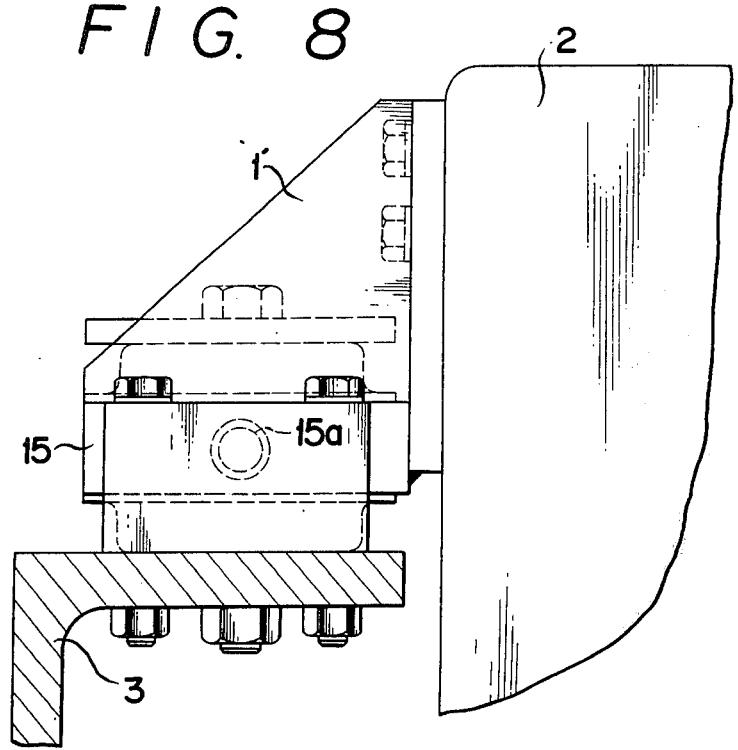

ENGINE MOUNTING APPARATUS

BACKGROUND OF THE INVENTION

This invention relates to an engine mounting apparatus, and more particularly to an engine mounting apparatus which can absorb engine vibration in every direction.

In the case where a cushionrubber is provided between an engine bracket and the base frame of a vehicle for absorbing engine vibration, no device for protecting the cushionrubber from the deflection thereof has heretofore been employed.

Based upon this reason, when the vehicle is suddenly stopped or if any shock load is applied to the vehicle, the deflection of the cushionrubber tends to exceed an allowable limit, thereby reducing the durability of the cushionrubber and causing serious damage to the engine mounting system.

Installing or connecting two or more mechanical parts together via cushionrubber is disclosed in German Pat. No. 937,134 or German Patent Publication No. 1,063,426.

This prior art, however, does not disclose or relate to an apparatus for mounting the engine on a vehicle body.

SUMMARY OF THE INVENTION

It is, therefore, an object of the present invention to provide an engine mounting apparatus having a safeguard for a cushionrubber of the engine mounting apparatus.

Another object of the present invention is to provide an engine mounting apparatus with a safeguard which can prevent or absorb marked vibration so as to protect cushionrubber from possible damage.

The present invention is directed to an engine mounting apparatus adapted to absorb engine vibration in every direction, comprising the base frame of a vehicle, a bracket for mounting the engine on said base frame, a first bolt means having a washer for fastening said bracket against said base frame, a first spacer disposed coaxially with said first bolt means, a cushion rubber disposed coaxially with said first bolt means between said washer and said base frame for holding said bracket, a second bolt means provided in spaced relation with said first bolt means, and a second spacer disposed coaxially with said second bolt means so as to provide a clearance between said bracket and outer periphery thereof.

The clearance between the bracket and the outer periphery of the spacer is large enough to allow vibration of the bracket during the normal running condition of the engine and is also small enough to allow collision of the bracket against the spacer when marked vibration of the engine occurs.

Other objects, features and advantages of the present invention will be readily apparent from the following description taken in conjunction with the accompanying drawings.

BRIEF DESCRIPTION OF THE DRAWINGS

FIG. 8 is a side view of the embodiment of FIG. 6.

DETAILED DESCRIPTION OF THE PREFERRED EMBODIMENTS

The present invention will now be described below by way of embodiments with reference to the accompanying drawings.

Figure 1:
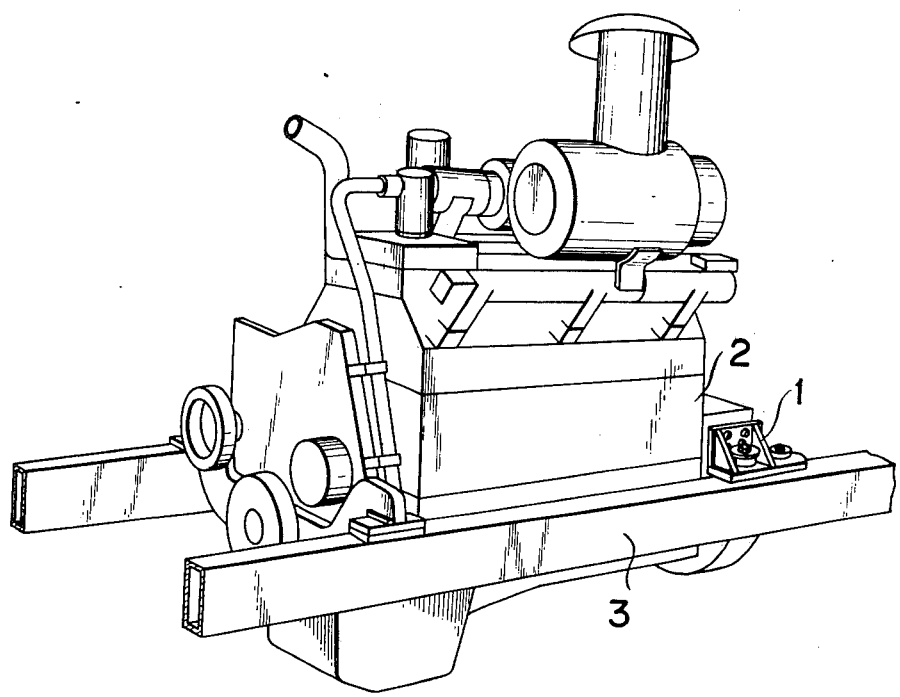
FIG. 1 illustrates a perspective view of an engine employing an engine mounting apparatus of the present invention.
Figure 2:
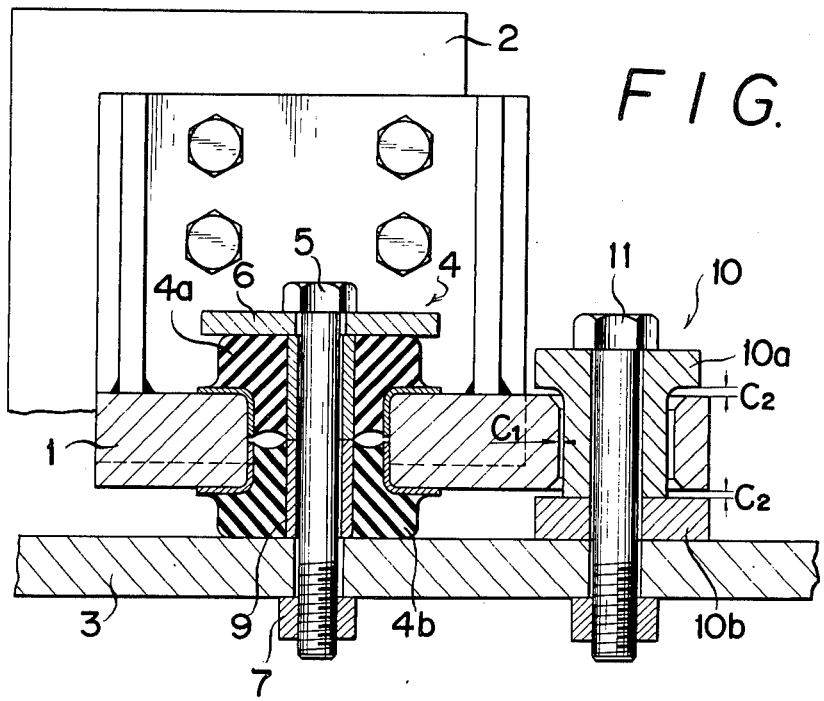
FIG. 2 is a longitudinal cross-sectional view of the present invention.
Figure 3:
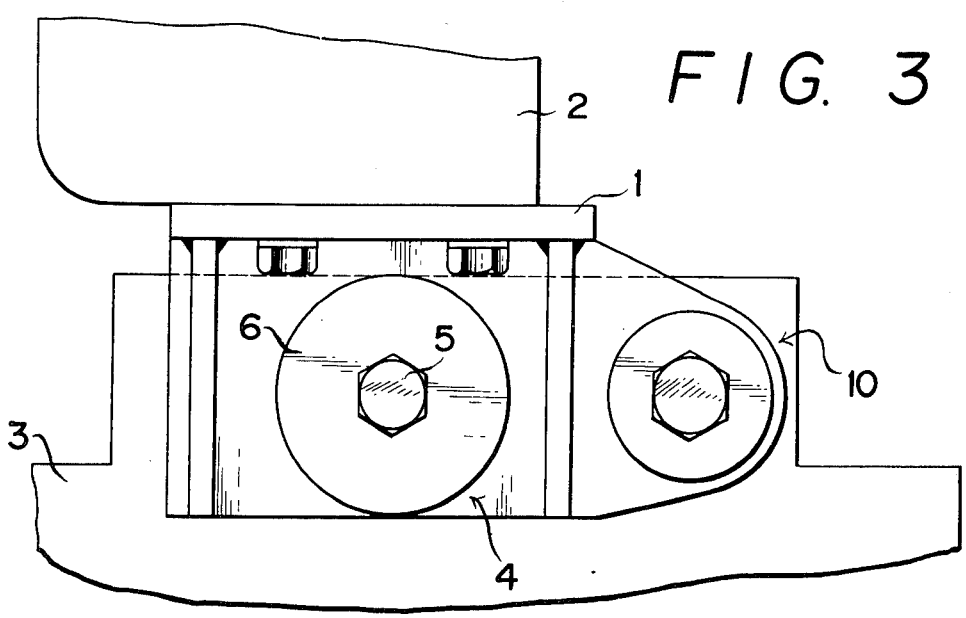
FIG. 3 is a plan view of the present invention.
Figure 4:
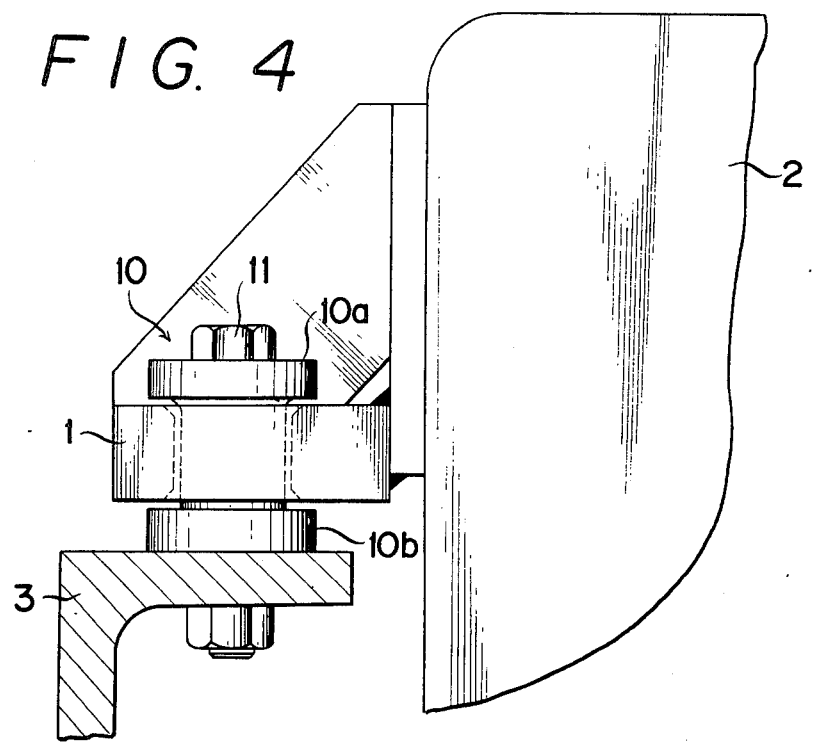
FIG. 4 is a side view of the present invention.
Figure 5:
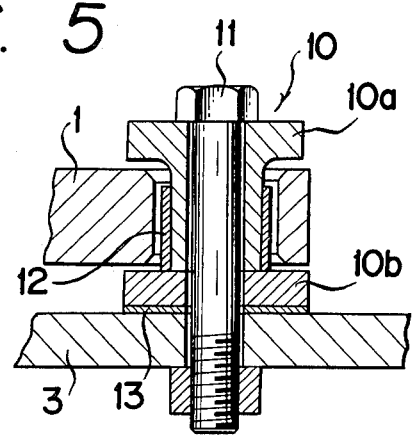
FIG. 5 is a cross-sectional view of the spacer means of the present invention wherein the clearance between the spacer and the bracket is adjustable.

In the drawings, reference numeral 1 denotes an engine mounting bracket fixedly secured to an engine 2, numeral 3 denotes a main frame of the vehicle body, and 4 a rubber vibration insulator means or cushionrubber interposed between the engine mounting bracket 1 and the main frame 3 of the vehicle body. The rubber vibration insulator means 4 comprises two rubber components 4a and 4b which sandwich the engine mounting bracket 1 in the vertical direction and which are rigidly secured to the main frame 3 of the vehicle body by a fixing bolt 5 which passes through the central part thereof, a washer 6 and a nut 7. The rubber components 4a and 4b of the rubber vibration insulator means 4 are attached to the engine mounting bracket 1 so as to hold the latter strongly thereby holding the engine 2 during the normal operating condition thereof. Reference numeral 9 denotes a spacer means rigidly adhered to the inside bores of the rubber components 4a and 4b. Reference numeral 10 represents a second spacer means located in spaced relation with the rubber vibration insulator means 4. The second spacer means 10 comprises spacer members 10a, 10b and bolt 11 adapted to fixedly secure the spacer members to the main frame 3 of the vehicle body. The second spacer means 10 is fitted on the above-mentioned engine bracket 1 so as to provide clearances $c_1$ and $c_2$ between the latter and itself in a direction at right angles to the axis thereof and in the vertical direction. The clearances $c_1$ and $c_2$ should be predetermined so as to be kept within allowable of deflection of the rubber vibration insulator means. Minor adjustments of the clearances $c_1$ and $c_2$ can be effected by means of a ring 12 and a shim 13 etc. as shown in FIG. 5. Such rubber vibration insulator means 4 are usually to be located in three or four places.

Thus, the vibration of the engine 2 in the vertical and horizontal directions in the normal operating condition thereof is absorbed or isolated by the rubber vibration insulator means 4, and at that time the engine mounting bracket 1 does not contact the second spacer means 10. When the vehicle is suddenly stopped or any shock load is applied to the vehicle tending to cause a large movement of the engine 2 in the horizontal or vertical direction so as to produce a large deflection of the rubber vibration insulator means 4, the second spacer means 10 serves to prevent the occurrence of such a large movement of the engine so as to prevent the generation of a large deflection of the rubber vibration insulator means 4 exceeding allowable limits.

Figure 6:
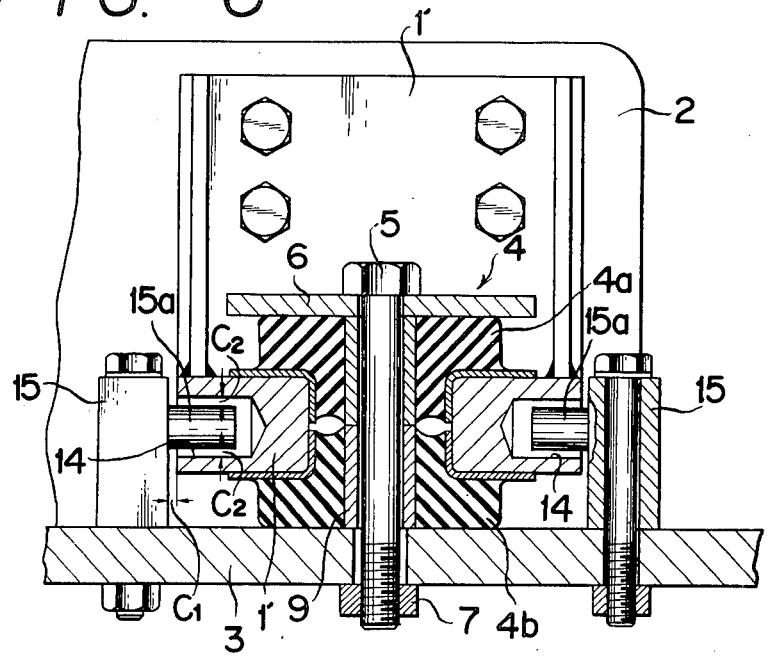
FIG. 6 is a longitudinal cross-sectional view of another embodiment of the present invention.
Figure 7:
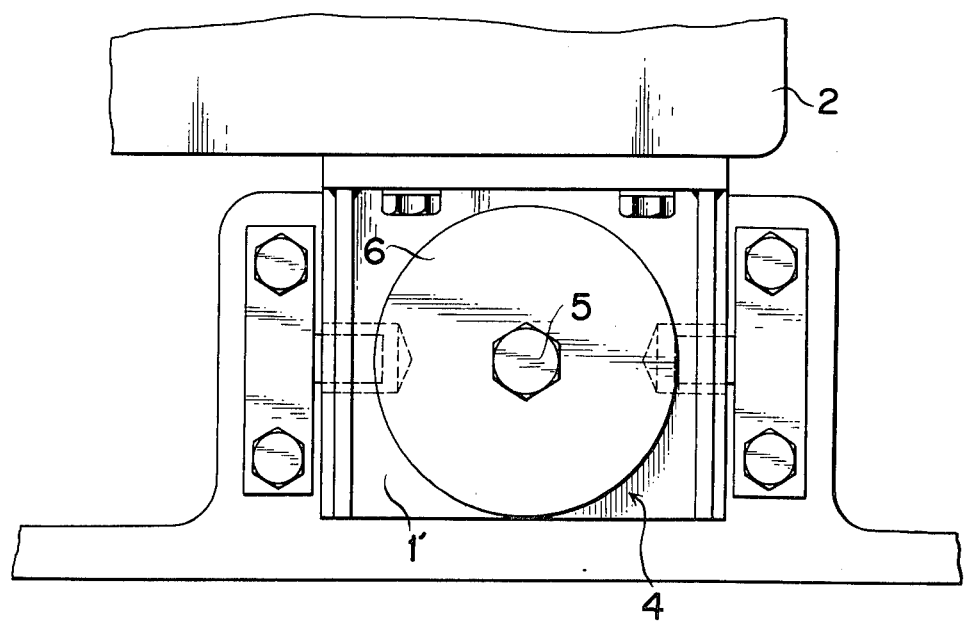
FIG. 7 is a plan view of the embodiment shown in FIG. 6.

FIGS. 6, 7 and 8 illustrate another embodiment of the present invention which differs from the first embodiment in the structure of the spacer means.

Stated more specifically, holes 14, 14 are formed on the opposite sides of an engine mounting bracket 1' carried by a rubber vibration insulator means 4. Projections 15a, 15a of spacer means 15, 15 fixedly secured to the engine mounting bracket 1' are fitted in the holes 14, 14, respectively. The arrangement is made such that vertical clearances $c_2$, $c_2$ are provided between the projections 15a, 15a and the holes 14, 14, respectively, and also clearances $c_1$, $c_1$ are provided between the both side faces of the engine mounting bracket 1' and the spacer means 15, 15, respectively.

In this embodiment too, the engine vibration under the normal operating condition can be absorbed or insulated by the action of the rubber vibration insulator means 4, while when a large movement or deflection of the latter occurs due to a large shock load applied thereto, such movement can be restricted by the action of the spacer means 15, 15.

Since various changes and modifications of the invention will occur to and can be made readily by those skilled in the art without departing from the concept of the invention, the invention is not to be taken as limited except by the scope of the appended claims.

What is claimed is:

1. An engine mounting apparatus adapted to absorb engine vibrations in every direction comprising a base frame of a vehicle, a bracket for mounting the engine on said base frame, a first bolt means extending through a first aperture in said bracket and having a washer for fastening said bracket against said base frame, a first spacer disposed coaxially about said first bolt means, a cushion rubber disposed coaxially about said first bolt means and said first spacer between said washer and said base frame for holding said bracket, a second bolt means provided in spaced relation with said first bolt means extending through a second aperture in said bracket, and a second spacer disposed coaxially about said second bolt means, a clearance being provided between said second aperture in said bracket and the outer periphery of said second spacer, said clearance being large enough to allow vibration of said bracket during the normal running condition of the engine and small enough to allow collision of said bracket against said second spacer when excessive vibration of the engine occurs.

2. An engine mounting apparatus according to claim 1 wherein said cushion rubber comprises a pair of cushion rubbers.

3. An engine mounting apparatus according to claim 1 wherein said bracket has a bore formed therein and said second spacer has a projection, said projection extending into the bore of said bracket so as to provide a clearance between the wall of the bore and the outer periphery of said projection.

* * * * *